April 4, 1939.　　　C. W. McKINLEY　　　2,153,095
GLARE SHIELD
Filed Feb. 17, 1936　　　2 Sheets-Sheet 1

Inventor
Charles W. McKinley
By Blackmore, Spencer & Flint
Attorneys

April 4, 1939.  C. W. McKINLEY  2,153,095
GLARE SHIELD
Filed Feb. 17, 1936  2 Sheets—Sheet 2
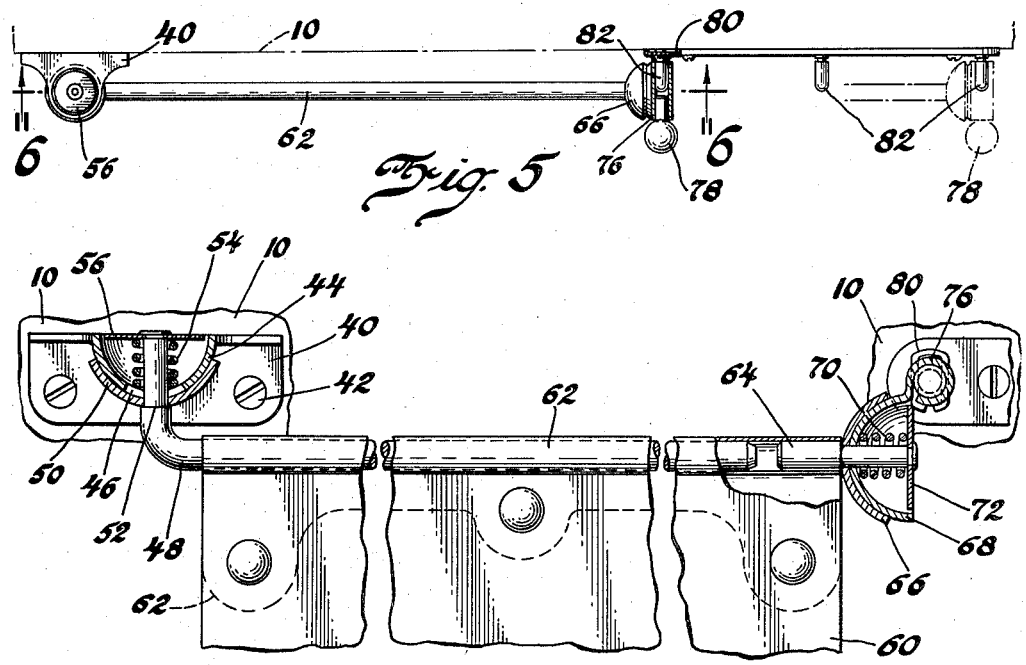
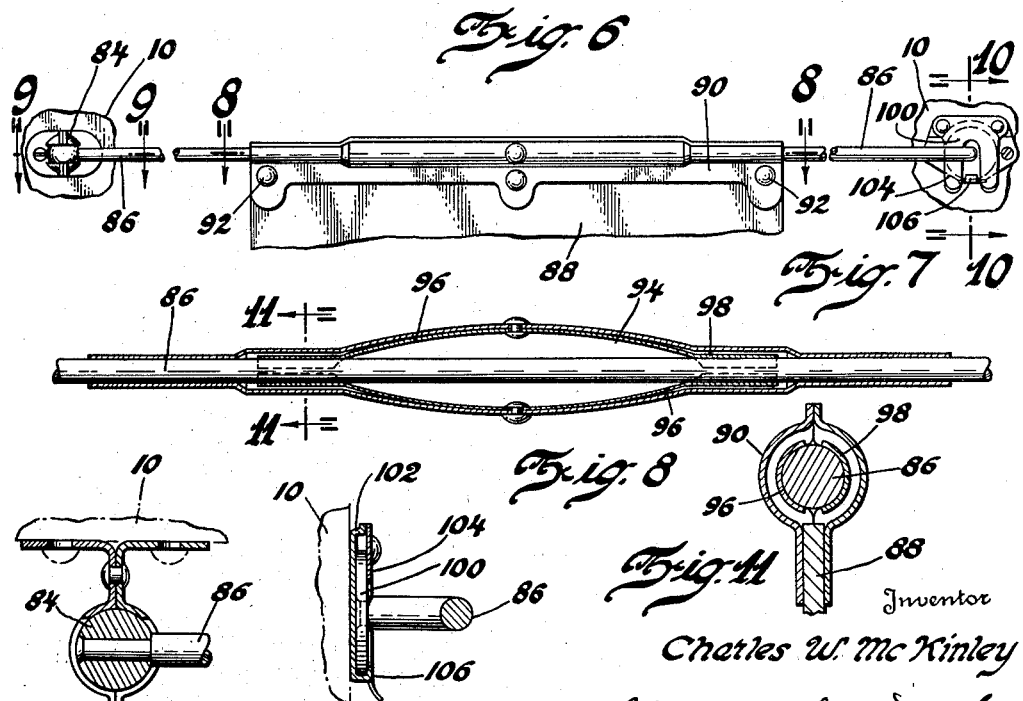
Inventor
Charles W. McKinley
By Blackmore, Spencer & Flint
Attorneys Patented Apr. 4, 1939

2,153,095

UNITED STATES PATENT OFFICE 2,153,095

GLARE SHIELD

Charles W. McKinley, Flint, Mich., assignor to General Motors Corporation, Detroit, Mich., a corporation of Delaware Application February 17, 1936, Serial No. 64,191

3 Claims. (Cl. 296—97)

This invention relates to a glare shield or sun visor of the type intended for mounting within the body of an automobile in the windshield header and intended to intercept the blinding rays of the sun in the daytime or similar rays of approaching headlights at night. It is adapted to intercept these rays without cutting off the necessary vision of the road, directly in front of the vehicle, from the driver's view. More specifically this invention relates to a glare shield so mounted on the interior of the car that it may be positioned at various points across the windshield as well as being able to swing to the side of the car and being vertically adjustable about a horizontal pivot.

With the glare shields at present provided on the interior of automobiles, the main body thereof normally lies parallel to the roof and may be swung about a rod running through one side and brought down in front of the driver's eyes to any desired position necessary to intercept the blinding rays. This type of shield is somewhat inadequate when the source of light causing the glare is not directly in front of the vehicle inasmuch as the shields cannot be moved transversely across the windshield or side window but may only be swung to one side to intercept rays coming through the side window adjacent the driver. When driving toward the sun in the early morning or late afternoon, it is usually necessary to lower the shield so that the road will be properly visible and the driver not blinded. However, there are very few, if any, roads which are exactly straight and therefore the relative position of the sun with respect to the windshield or side window changes and the sun will move, in effect, to one side or the other of the glare shield and the driver will still be bothered by the bright rays due to the fact that the source of light is coming in at an angle to the car and the shield is too short to prevent the glare from disturbing the vision of the driver.

It is therefore the object of my invention to provide a glare shield which may easily be moved and positioned at points across the windshield or side window so that as the road curves and the source of light assumes a different angularity the shield may be moved to a proper position to intercept the rays coming toward the car from the new angles.

Further objects and advantages of my invention will be evident upon reference to the following specification wherein there are described the embodiments of my invention which are illustrated in the accompanying drawings, in which.

Figure 2:
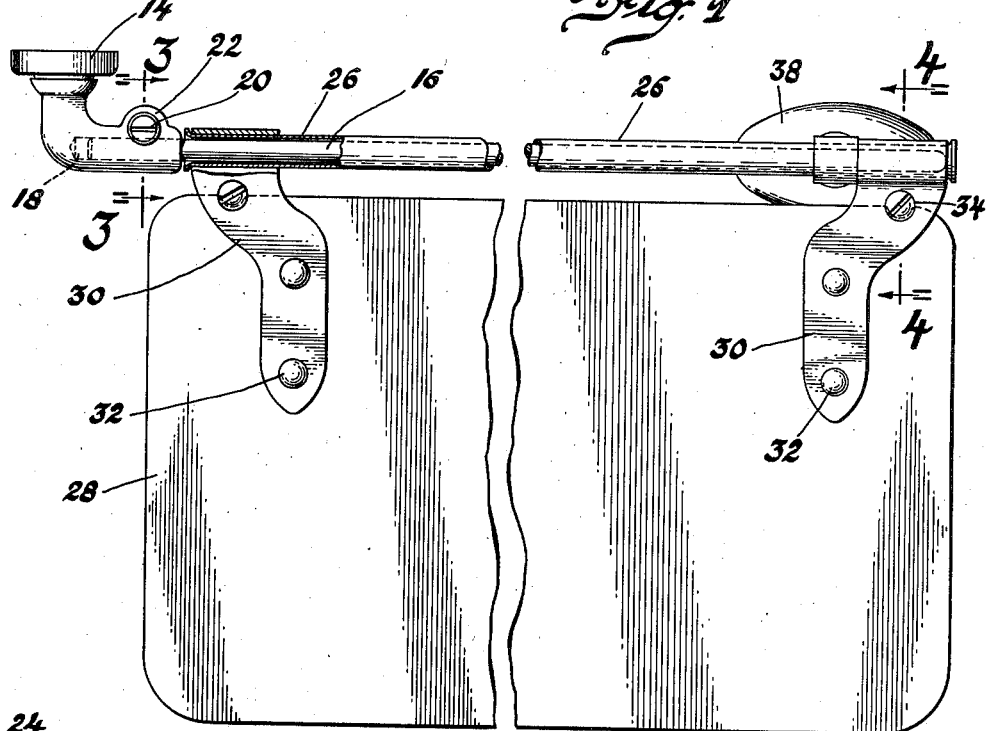
Fig. 2 is an enlarged front elevation of the glare shield and supporting structure, parts being broken away and shown in section.
Figures 3, 4:
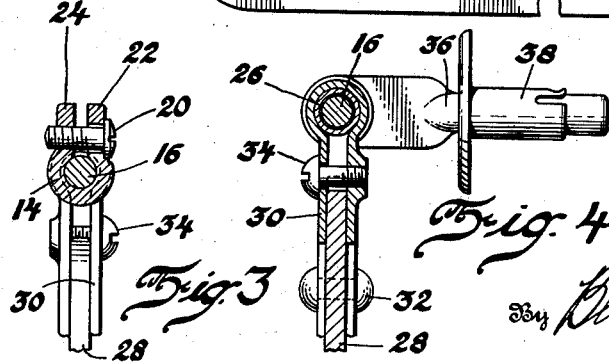

Figs. 3 and 4 are sectional views taken on lines 3—3 and 4—4, respectively, of Fig. 2.

Fig. 5 is a plan view of a modified form of the supporting rod for a similar glare shield.

Fig. 6 is an enlarged sectional view taken on line 6—6 of Fig. 5.

Fig. 7 is a front elevation of a still further modified form of my invention, and, Figs. 8, 9 and 10 are sectional views taken on lines 8—8, 9—9 and 10—10, respectively, of Fig. 7.

Fig. 11 is a sectional view taken on line 11—11 of Fig. 8.

An automobile body 2 is provided with the usual windshield 4 and two front doors 6 and 8, there being a header 10 running between the two side doors and above the windshield. Secured over the whole, of course, is the top 12. An angled swivel bracket 14 is secured to the top on the left hand front corner thereof and supports one end of a horizontally disposed rod 16 which extends transversely of the vehicle. This rod extends into an opening 18 in the angled bracket 14 and a screw 20, projecting through one split side of the angled end 22 and threaded into the opposite side 24, is used to clamp the end of the rod 16 tightly therein.

Slidably supported by the rod 16 is a hollow sleeve member 26 which carries a glare shield 28 by two brackets 30; said glare shield may be constructed of any desired material and is preferably opaque to light rays but may, if desired, be translucent. The brackets 30 are rigidly connected to the glare shield by rivets 32 and extend up around the sleeve 26 and back down the opposite side of the glare shield, the upper portion being enlarged and having sliding friction connection with the sleeve 26.

Extending between the arms of the brackets 30, adjacent the sleeve 26, is a small screw 34 which may be used to regulate the friction between the glare shield and the sleeve 26 by tightening or loosening the clamping action in order to allow the glare shield to be pivoted thereabout for various vertical adjustments and still prevent the same from rotating too easily.

Figure 1:
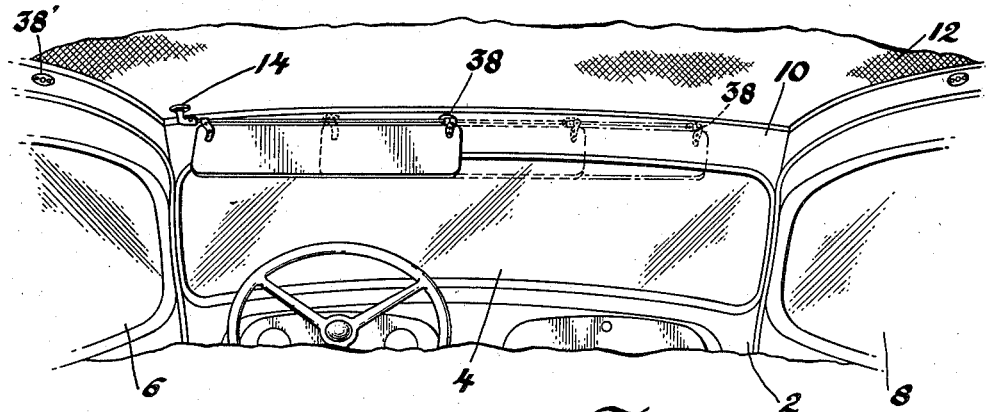
Fig. 1 is a view of the interior of the car looking toward the windshield and showing my invention in place.

Also rigidly secured to the right hand end of the sleeve 26 is a projecting pin 36 which is adapted to project into any one of the series of sockets 38 securely positioned in the header 10. These pins 36 may be formed with an eye extending around the outer periphery of the sleeve 26 and rigidly secured thereto in any desired manner. It will thus be evident, that, when in normal position, the pin 36 will engage the socket 38 which is nearest the center of the vehicle as shown in Fig. 1, and that the sun visor may then be tilted about the shaft and sleeve to any desired vertical position as set by the operator. However, as the angularity of the sun moves to a position toward the right, the pin 36 may be disengaged from that socket 38 and the shield may be moved to either one of the dotted line positions with the pin 36 engaging one of the other sockets. This may also be done on the side with socket 38' or similar sockets along the side. The rod 16 will, of course, have a telescopic action in this respect to the sleeve 26 and allow the sleeve 26 to bodily be moved toward the right. In this way the glare shield may be positioned at any effective point across the windshield or side window.

The modified form of my invention, shown in Figs. 5 and 6, illustrates a bracket 40 secured to the header 10 by suitable screws 42, said bracket including a semi-spherical portion 44 having an opening 46 at the bottom thereof and the end of the angled rod 48 projecting through this opening. A matching semi-spherical shell 50 is carried by the rod 48 and held from sliding along the body of the rod by larger portion 52. The end of the rod is of smaller cross section than the main body and carries a coil spring 54 which bears against the inner surface of the semi-spherical portion 44 of the bracket and also against the disk 56 held on the extreme end of the smaller section by any suitable means such as riveting. The rod 48 extends transversely to the vehicle and carries thereon a glare shield 60 by clamping means 62 riveted to the glare shield and extending up over the rod 48 in much the same manner as the clamps disclosed in the first modification to form a hollow sleeve around the rod. This sleeve portion frictionally engages the rod 48 but may be moved with respect thereto, the friction between the two parts being of sufficient strength to maintain the glare shield in any position that the operator desires to place the same.

In the extreme right hand end of the sleeve portion of the supporting member 62 is rigidly positioned a short plug 64, the projecting end having a slightly smaller cross section and carrying a semi-spherical shield 66 which is held against the shoulder thus provided and which projects through a matching semi-spherical shell 68 and held tightly in place against the same by a coil spring 70 which bears against the inner surface of the shell 68 and its outer extremity engages a disk 72 secured to the end of the plug 64 by riveting in identically the same manner as the plate 56 is supported in the opposite extremity of the rod 48. The upper portion of the shell 68 provides a rolled sleeve 76 integral with the shell which is hollow and secured in one end is a small ball-headed plug 78 which is adapted to be used in moving the glare shield. Secured to the header 10, upon a base member 80 screwed to the header, is a series of horizontally extending pins 82 at various positions. It is therefore evident that the double matching shell construction of the end of the rod 48 will allow a certain amount of relative movement between the glare shield and the car body and will allow the operator, by grasping the ball-headed plug 78, to pull the hollow socket member 76 from the pin 82 and applying it to any one of the other pins. The sleeve member 62 of the glare shield will have a similar telescopic action with the rod 48 and may be slid along the same to allow the shield to be positioned in any desired location.

Figs. 7-11 illustrate a still further modification of my invention and in this form we have a split ball and socket joint 84 the stationary part of which is secured to the header 10 of an automotive vehicle the ball being rigidly secured to a rod 86 extending transversely across the car body. This construction will allow considerable amount of vertical movement of the rod within the bar and also horizontal rotation about this point as a pivot. The glare shield 88 has secured to its top a long sleeve-like bracket 90 by rivets 92 which sleeve-like member surrounds the rod 86 and is slidable thereon. The central portion of this supporting bracket 90 is expanded to provide an inner hollow portion 94 which is spaced away from the rod 86 and carried on the inner surface thereof are two matching spring members 96, the ends 98 of which contact a portion of the periphery of the rod and are adapted to press against the rod 86 to provide the necessary friction between the rod and the glare shield to allow different positioning without slippage. The opposite end of the rod 86 is bent at right angles thereto and carries a small disk 100 which is riveted securely thereto. Fastened to the header 10 is a plate member 102 the upper edge of which is flanged outwardly and carries a vertical member 104 which is formed of two fingers adapted to project downwardly on the outer surface of the disk 100 when it is in position and secure the same against the header, the lower extremity of the disk 100 snapping inside an angled lug 106 projecting from the lower edge of the plate 102. To assemble this it is merely necessary therefore to push the disk up under the two fingers of the member 104 until it snaps over the top of the lug 106 following which it moves downwardly within the lug and is thus securely positioned. In this form the rod 86 runs substantially across the body of the car above the windshield or side window and it is therefore merely necessary to slide the glare shield transversely to any position desired for the proper ray interception.

It is therefore obvious that I have provided in any one of these forms an adjustable glare shield which may be positioned in any one of a number of positions across the windshield or side window to intercept rays coming from various angles.

I claim:

1. In a vehicle body having a windshield mounted therein, a rod detachably secured to the body across the top of the windshield, a hollow member surrounding a portion of the rod and adapted to slide upon the same, a glare shield carried by the member and resilient means within the hollow member and frictionally engaging the rod to allow adjustment of the member either rotationally or longitudinally with respect to the rod and yet hold the member in its set position on the rod.

2. In a vehicle body having a windshield mounted therein, supporting means detachably secured to the body across the top of the windshield, hollow means surrounding a portion of the supporting means and adapted to have axial and rotative relative motion with respect thereto, friction means between the hollow means and the supporting means to hold the former in any set position and a glare shield carried by the hollow means.

3. In a vehicle body having a windshield mounted therein, a rod, means for mounting the rod across the top of the windshield including a ball and socket joint on one end and a spring clip on the opposite end, a hollow sleeve mounted on the rod and adapted to slide thereon having different diameters at spaced points along its length, the diameter being greatest near its midpoint and oppositely acting springs within the sleeve secured at the center and urged against the rod to prevent relative motion between the sleeve and rod under normal vibration but when forced allowing such action, and a glare shield carried by the sleeve.

CHARLES W. McKINLEY.